Feb. 12, 1952     H. A. DIBBLE     2,585,635
MEANS FOR THE REPAIR OF PUNCTURED TIRES
Filed Aug. 13, 1949
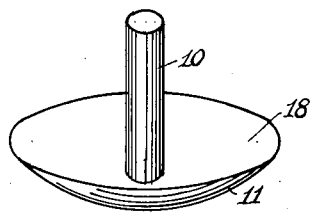
Fig. 1.
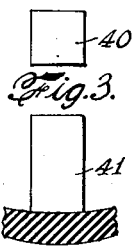
Fig. 2.
Fig. 3.
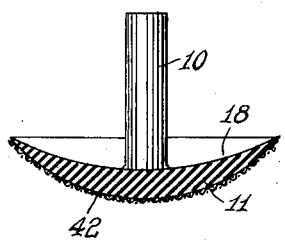
Fig. 4.
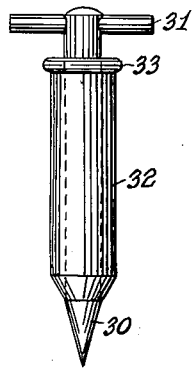
Fig. 5.
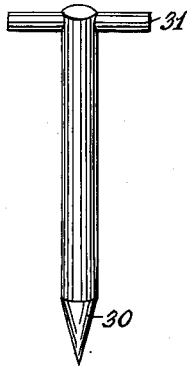
Fig. 6.
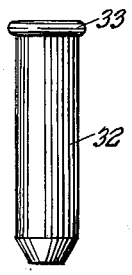
Fig. 7.
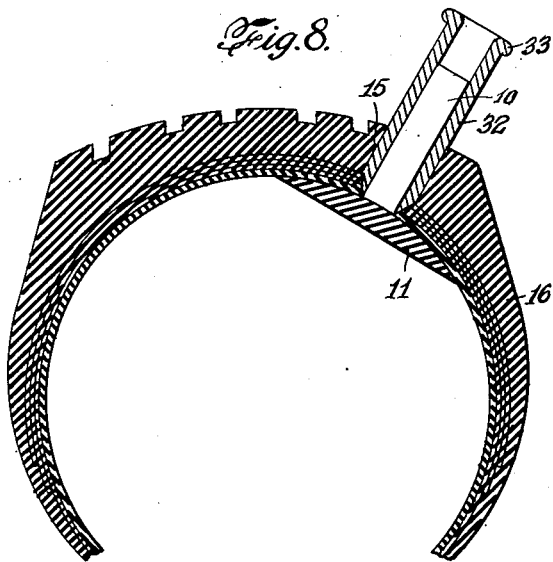
Fig. 8.
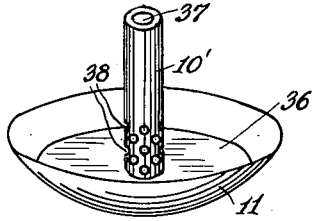
Fig. 9.
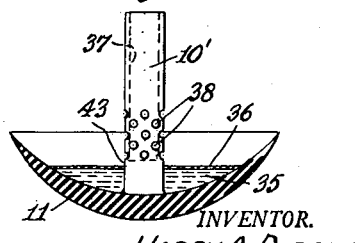
Fig. 10.
INVENTOR.
HARRY A. DIBBLE
BY
ATTORNEY.

Patented Feb. 12, 1952

2,585,635

UNITED STATES PATENT OFFICE 2,585,635

MEANS FOR THE REPAIR OF PUNCTURED TIRES

Harry A. Dibble, New York, N. Y.

Application August 13, 1949, Serial No. 110,073

2 Claims. (Cl. 152—367)

This invention relates to new and useful improvements in the repairing of pneumatic tires, and it has for its object to provide a device, or means, which will not only patch up any hole, or cut, in a tire but will, in addition, and simultaneously therewith seal said patch to the tire in such a manner as to obtain a perfect and solid surface of said tire, where the latter has been punctured.

To attain this result I employ what may appropriately be termed "an injector vacuum plug," which preferably consists of a mushroom-shaped patch made of any suitable material, such as rubber, rubber and canvas, or a composition of rubber, and which has a stem arranged centrally and integrally therein. Said stem, while forming part of the means for closing the puncture in the tire, also serves the purpose of securing the patch solidly in the right place and position, as said stem is inserted through the puncture in the tire by means of tools, which will be hereinafter described.

The said patch is normally of a mushroom-shape, tapered toward its periphery, with a convex outer surface and a concave or comparatively deeply depressed inner surface adapted to abut the inner surface of a tire.

Thus, when said patch is arranged against the tire and pulled toward the latter by means of the stem, said patch is by a vacuum suction held solidly and tightly against the tire.

The patch may be made with a round, square or flat stem, so as to approximately fit the cut in the tire.

Thus, if said cut should be of a zig-zag or oblong shape, a rectangular stem may be most suitable, when used complementary with the patch, to fill out said hole in the middle or center portion of the tire wall proper, as during the pressure applied to the tire, when in use, said rectangular stem will substantially, due to said pressure, assume the shape of the cut in the tire and merge with the latter in filling out the oblong cut in the body of said tire.

In addition to, and separate from the vacuum effect, a strongly adhesive substance, such as a rubber-cement, is applied to the inner side of the patch and to the stem, so as to secure a solid binding of the patch and stem to the inner surface of the tire, and cut in the tire wall, respectively. Once inserted, the end of the stem projecting outside of the tire is cut off flush with the latter.

In a modification of my device, as shown in the drawing, a fluid adhesive compound is disposed in the inner depression of the patch, while a thin membrane, which snugly surrounds the stem, is placed tightly over said compound to keep it in a fluid state. The said stem is in this instance made with a great number of perforations leading to the center of the stem, which in this case is formed with a vertical central tubular opening therein. Thus, when in this modification the patch is pressed tightly against the inner tire wall said membrane will due to its thinness automatically break with the result that the adhesive substance is not only applied between the patch and the inner tire wall, but will also by means of the perforations in the hollow stem be applied to the body of the tire wall surrounding said stem.

With the above and other objects in view, this invention consists of the novel features of construction, combination and arrangement of parts, hereinafter fully described, claimed and illustrated in the accompanying drawing forming part of this application, and in which similar characters of reference indicate corresponding parts in all views, and in which:

Figure 1 is a somewhat perspective elevational view of my device, showing an injector vacuum plug, having a round stem.

Figures 2 and 3 are detail views, showing the stem to be of a square or flat shape, respectively.

Figure 4 is a transverse sectional view of Figure 1, but showing as a modification the bottom part of the plug or patch to be of canvas.

Figure 5 shows in elevation, as an ensemble, a tire casing repair tool.

Figure 6 shows in a somewhat perspective elevation a spike-like member, forming part of said tool; while Figure 7 is an elevation of a tubular member adapted to receive said spike-like member when the tool is inserted in a tire puncture, and subsequently the stem of the patch.

Figure 8 is a fragmentary transverse sectional view of a tire casing showing a patch and stem embodying the principle of the invention in puncture sealing relation therewith, the tubular member still embracing the stem of my device.

Figure 9 is a perspective view, showing a modification of my device; while

Figure 10 is a vertical transverse sectional view of Figure 9.

The tool for placing a patch in position relative to a tire casing comprises a spike-like member 30 having a handle 31, said member 30 is disposed in a tubular member 32, and this ensemble is next inserted through the puncture of the tire. The tubular member is at its lower end tapered so as to snugly engage the spike-like member in order to secure a ready insertion into the puncture of the tire.

When the tubular member 32 is thus placed in position in the puncture 15 of the tire 16 the spike-like member 30 is withdrawn and the stem 10 of the patch 11 inserted into said tubular member and drawn through the puncture by the latter, which is operated by the handle 33.

A strong adhesive is placed upon the inner side of the patch, and the latter will, when flexed, form a tight juncture with the inner surface of the tire, due to the vacuum between said tire and the inner surface of the patch, which latter is deeply depressed, as shown at 18 in Figure 1. The tubular member is subsequently withdrawn, and the portion of the stem protruding outside the tire cut off.

Figure 9 shows a modification wherein an adhesive 35 is placed in the bottom of the patch 11 and kept in a fluid condition by means of a membrane 36, which forms a tight closure with the patch 11 and stem 10'. The said stem is in this instance formed with a vertical tubular opening 37 therein, extending downwardly, but terminating slightly above the membrane, as shown in dotted lines at 43.

The stem 10' has perforations 38 leading from the outside to the tubular opening in said stem. Said perforations are all arranged in the stem 10' above the membrane; however, a number of said perforations are in so close proximity to the membrane that when the latter, as hereinbefore described, breaks in the course of affixing and pressing the patch onto the inner surface of a tire casing, the fluid 35 covered by said membrane will, when the latter breaks, enter the lower perforations in the stem and due to the pressure upon the patch in affixing the same, be discharged through the perforations arranged in a higher position in the stem, whereby said adhesive fluid will not only serve as a binder between the patch and the inner surface of the tire casing, but also as a binder between the stem and the actual wall of the casing, where the latter has been cut through by said puncture.

The stem hereinbefore referred to as square is indicated by the numeral 40, while the flat stem is indicated by 41, and the canvas-covered lower part of the patch in Figure 4 by the numeral 42.

It is obvious that changes may be made in the form, construction and arrangement of the several parts, as shown, within the scope of the appended claims, without departing from the spirit of the invention, and I do not, therefore, wish to limit myself to the exact construction shown and described herein.

What I claim as new, and desire to secure by Letters Patent of the United States, is:

1. Means for the repair of a punctured tire, comprising a mushroom-shaped patch tapered towards its periphery, and a stem integral with said patch, said patch being formed with a deep cavity around said stem, a liquid adhesive agent at the bottom of said cavity, a membrane covering said adhesive agent in an air-tight manner, said membrane being made with a hole therein adapted to receive said stem and form an air-tight junction with the latter, the stem being formed with a tubular opening therein extending downwardly to slightly above the membrane, said stem being provided with a plurality of perforations leading from the outside to the tubular opening.

2. In a device, as claimed in claim 1, and wherein the lowermost of said perforations are arranged in close proximity to said membrane, above the latter.

HARRY A. DIBBLE.

REFERENCES CITED

The following references are of record in the file of this patent:

UNITED STATES PATENTS

| Number | Name | Date |
| --- | --- | --- |
| 852,716 | Hall | May 7, 1907 |
| 1,188,998 | Rood | June 27, 1916 |
| 1,597,945 | Young | Aug. 31, 1926 |